3,553,217
2-(QUINOLINIMIDO)GLUTARIMIDE

Jorge P. Li, Ramona H. Jules, and John H. Biel, Milwaukee, Wis., assignors to Aldrich Chemical Company, Inc., Milwaukee, Wis., a corporation of Wisconsin
No Drawing. Filed Oct. 18, 1968, Ser. No. 768,904
Int. Cl. C07d 57/04
U.S. Cl. 260—281                                                3 Claims

ABSTRACT OF THE DISCLOSURE 2-(quinolinimido)glutarimide exhibits sedative activity and is useful as a sedative in mammals. 2-(quinolinimido)glutaramic acid is useful as an intermediate in a process for preparing 2-(quinolinimido)glutarimide.

SUMMARY OF THE INVENTION

There is provided according to the present invention 2-(quinolinimido)glutarimide which has the formula

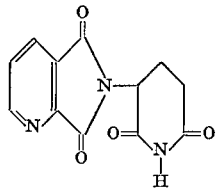

The compound of this invention may be prepared from known materials as exemplified below by the following series of reactions.

(1) Quinolinic anhydride

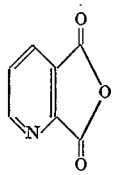

is treated with L(+)-glutamine

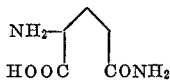

in the presence of a nonreactive solvent, e.g., pyridine at a temperature of from about 20° to about 120° C. and preferably at reflux temperature to produce 2-(quinolinimido)glutaramic acid

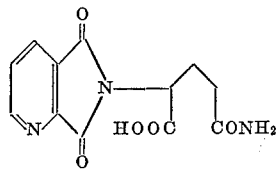

(2) 2-(quinolinimido)glutaramic acid is cyclized with an acyl halide (chloride, bromide or iodide) containing about 2 to 8 carbon atoms at a temperature of about —5° to 100° C. to produce the compound of this invention 2-(quinolinolimido)glutarimide

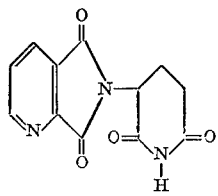

Representative of the acyl halides useful in this step are acetyl chloride, acetylbromide, propionyl chloride and the like. Preferably acetyl chloride is utilized in the reaction and the reaction is carried out in the presence of a nonreactive polar organic solvent, e.g., dimethylformamide ethylene glycol, dimethyl ether, diglyme and the like but preferably dimethylformamide.

The compound of this invention possesses sedative activity making it useful as a sedative in mammals, e.g., mouse, rat, dog, monkey and the like.

The compound of this invention may be compounded and formulated into pharmaceutical preparations in unit dosage form for oral or parenteral administration with organic or inorganic solid materials or liquids which are pharmaceutically acceptable carriers. Some examples of the carriers which can be used are gelatin capsules, sugars, cellulose derivatives such as carboxymethylcellulose, gelatin, talc, magnesium stearate, vegetable oil such as peanut oil, etc., liquid petroleum, glycerin, sorbitol, ethanol, agar, elixirs, syrups and water including sterile water. The composition may take the form of tablets, powders, granules, capsules, suspensions, solutions and the like.

The compound of this invention when administered orally or parenterally in a sedative amount is effective in producing sedation in mammals. An oral dosage range of about 0.7 to about 3 milligrams per kilogram per day is convenient for producing sedation in mammals, which may be administered in divided dosage, e.g., two, three or four times a day. Administration of the compound is conveniently begun at the minimal effective dose (MED) or $ED_{50}$ of the particular compound in the particular species of mammal. However, in general, the particular dosage most suitable for a particular application, as might be expected, will vary with the age, weight and general health of the mammal under treatment and the degree of sedative effect required. After taking into consideration these factors and any other factors to be considered, one skilled in the art of treating diseases of mammals can readily determine the appropriate dosage.

The following examples are intended to illustrate the invention described herein without unduly restricting it.

EXAMPLE 1

Preparation of 2-(quinolinimido)glutaramic acid

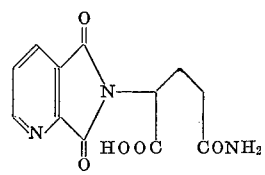

A mixture of quinolinic anhydride (4.5 g., 30 mmol), L(+)-glutamine(4.4 g., 30 mmol), and pyridine (20 ml.) was refluxed for 3 hours. The pyridine was removed in vacuo and the residue taken up in ethanol-methanol (9:1), filtered through charcoal-Celite. Concentration of the filtrate gave the pure crystalline product, which was washed with hot methanol and dried in vacuo. Yield: 0.88 g. 2-(quinolinimido)glutaramic acid, M.P. 238.5°–240° C. (dec.). Infrared (Nujol) 2.87 (sharp), 3.1, ca. 4 (broad), 5.32 (w), 5.57 (sharp), 5.8, 5.98, 6.2μ.

*Analysis.*—Calc'd for $C_{12}H_{11}N_3O_5$ (277.24) (percent): C, 51.99; H, 4.00; N, 15.16. Found (percent): C, 51.89; H, 3.91; N, 15.02.

A repeat of the same reaction at the same molar quantities of reagents gave the product in 41% yield (3.4 g., 12.3 mmol).

EXAMPLE 2

Preparation of 2-(quinolinimido)glutarimide

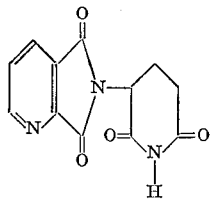

To a stirred suspension of 2-(quinolinimido)glutaramic acid (3.0 g., 10.8 mmol) in dimethylformamide (5 ml.) was added dropwise acetylchloride (2.5 g., 32.4 mmol) at room temperature. The mixture was refluxed for 2.5 hr., stirred at room temperature for 30 min., and evaporated in vacuo. The residue was taken up in methanol, treated with charcoal, and recrystallized from methanol, giving the product, 2-(quinolinimido)glutarimide (1.3 g., 5 mmol, 46.3% yield). Recrystallization from methanol afforded the analytical sample, white, fine needles, M.P. 257–258.5° C. (dec.). The infrared spectrum (Nujol) confirmed the structure: 3.1 (w), 3.22 (w), 5.59 (w), 5.79, 5.9, 6.25μ.

*Analysis.*—Calc'd for $C_{12}H_9N_3O_4$ (259.23) (percent): C, 55.60; H, 3.50; N, 16.21. Found (percent): C, 55.38; H, 3.38; N, 16.20.

While this invention has been described and exemplified in terms of its preferred embodiment, those skilled in the art will appreciate that modifications can be made without departing from the spirit of the invention.

We claim:
1. The compound having the formula:

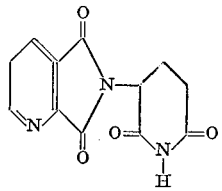

2. A process of preparing the compound of the formula:

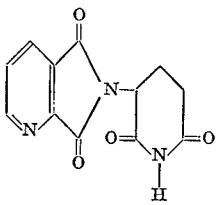

which comprises:
 (a) treating quinolinic anhydride with L(+)-glutamine to produce 2-(quinolinimido)glutaramic acid; and
 (b) cyclizing 2-(quinolinimido)glutaramic acid by treatment of said acid with an acyl halide of 2 to 8 carbons to produce the desired product.

3. A process of preparing the compound of the formula:

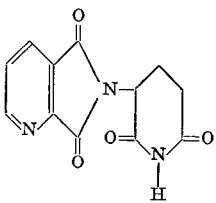

which comprises cyclizing 2-(quinolinimido)glutaramic acid by treatment of said acid with an acyl halide of 2 to 8 carbons to produce the desired product.

References Cited
UNITED STATES PATENTS 2,830,991  4/1958  Keller _____ 260—281
3,314,960  4/1967  Freed _____ 260—281

DONALD G. DAVIS, Primary Examiner

U.S. Cl. X.R.

260—295, 534, 544; 424—267